United States Patent
Nandi et al.

(10) Patent No.: US 12,469,236 B2
(45) Date of Patent: *Nov. 11, 2025

(54) METHOD AND SYSTEM FOR GENERATING DATA-ENRICHING AUGMENTED REALITY APPLICATIONS FROM A DOMAIN-SPECIFIC LANGUAGE

(71) Applicant: OHIO STATE INNOVATION FOUNDATION, Columbus, OH (US)

(72) Inventors: Arnab Nandi, Columbus, OH (US); Codi Burley, Grove City, OH (US); Ritesh Sarkhel, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,998

(22) Filed: May 13, 2024

(65) Prior Publication Data
US 2024/0362870 A1    Oct. 31, 2024

Related U.S. Application Data

(63) Continuation of application No. 17/208,196, filed on Mar. 22, 2021, now Pat. No. 11,983,825.

(60) Provisional application No. 63/028,815, filed on May 22, 2020.

(51) Int. Cl.
*G06T 19/00* (2011.01)
*G06F 8/41* (2018.01)
*G06F 16/24* (2019.01)
*G06F 16/2453* (2019.01)
*G06F 16/2458* (2019.01)
*G06N 7/01* (2023.01)

(52) U.S. Cl.
CPC ............ *G06T 19/006* (2013.01); *G06F 8/433* (2013.01); *G06F 16/24544* (2019.01); *G06F 16/2468* (2019.01); *G06N 7/01* (2023.01)

(58) Field of Classification Search
CPC .............. G06T 19/006; G06F 16/2468; G06F 16/24544; G06F 8/433; G06N 7/01
USPC ...................................................... 345/633
See application file for complete search history.

(56) References Cited

U.S. PATENT DOCUMENTS

| | | | |
|---|---|---|---|
| 2009/0094274 A1* | 4/2009 | Gorelik ................. | G06F 16/211 |
| | | | 707/999.102 |
| 2017/0147645 A1* | 5/2017 | Song ................. | G06F 16/24544 |
| 2019/0384762 A1* | 12/2019 | Hill ...................... | G06F 16/2272 |
| 2021/0096543 A1* | 4/2021 | Stump ...................... | G06F 8/20 |

* cited by examiner

*Primary Examiner* — Hai Tao Sun
(74) *Attorney, Agent, or Firm* — Meunier Carlin & Curfman LLC

(57) ABSTRACT

Systems and methods are provided that allow developers to quickly and easily develop augmented reality (AR) applications that enrich the real-world with data from the cloud. Given that the development of an AR application is a complex and time-consuming process, the systems and methods described herein allow software developers to concisely describe their needs in a succinct program, written in the QWL domain-specific language. The systems and methods take this program and automatically generate an AR application.

14 Claims, 10 Drawing Sheets

```
type  Environment   =  Decls    [Declaration]

type  Declaration   =  Declaration
{   identifier      ::  Identifier
,   expression      ::  Expression
,   evaluation      ::  Maybe Value
,   waitedBy        ::  [Identifier]
} type Expression =
    Constant            |
    Reference           |
    WaitedApplication   |
    Context             |
    DataSource          |
    Embedding           |
    NearestNeighbors    |
    FuzzyJoin           |
    StoredEmbedding     |
    ClientResponse      |
```

METHOD AND SYSTEM FOR GENERATING DATA-ENRICHING AUGMENTED REALITY APPLICATIONS FROM A DOMAIN-SPECIFIC LANGUAGE

CROSS-REFERENCE TO RELATED APPLICATIONS

This application is a continuation of U.S. patent application Ser. No. 17/208,196, filed on May 22, 2021, and entitled "METHOD AND SYSTEM FOR GENERATING DATA-ENRICHING AUGMENTED REALITY APPLICATIONS FROM A DOMAIN-SPECIFIC LANGUAGE," which claims the benefit of U.S. Provisional Patent Application No. 63/028,815, filed on May 22, 2020, and entitled "METHOD AND SYSTEM FOR GENERATING DATA-ENRICHING AUGMENTED REALITY APPLICATIONS FROM A DOMAIN-SPECIFIC LANGUAGE." The disclosures of both are expressly incorporated herein by reference in their entireties.

STATEMENT OF GOVERNMENT SUPPORT

This invention was made with government support under Award Number 1453582 awarded by National Science Foundation. This invention was made with government support under Award Number 1910356 awarded by National Science Foundation. The government has certain rights in the invention.

BACKGROUND

The amount of data encountered daily is unfathomable. Digital interfaces (mobile devices, computers, wearables, etc.) provide a window into the immensity of data available through the internet. Switching contexts into the physical world (the real-world), does not escape data exposure to things such as movie posters, billboards, menus at a cafe, grocery lists, etc. Although this real-world data is diverse and rich with complexity, it is one-size-fits-all, where all see the same information irrespective of their needs. If an observer wishes to gain insights on real-world data such as "the critics opinion on a movie in poster", they have to find a tool that can answer their question and then come up with the appropriate input in order to get a useful answer out of the tool. Thus, information presented in the real-world is incomplete with respect to the desires of any given consumer, and appears in isolation, providing little to no context. For example, restaurant menus often lack supplemental information such as ingredients used, allergens present, and recent customer reviews that could help the user to make a quick and informed decision. As a result of this real-world data's ad-hoc nature and incompleteness, supplementary information is retrieved from applications on personal devices, requiring that users make the needed connections to join real-world data with remotely stored data.

In the last decade, augmented reality (AR), a technology to overlay the physical world with digital information, has become consumer-grade and widely available through mobile devices. Beyond its many entertainment-based applications, AR has made its impact in fields such as education, medicine, and emergency services. Likely as a result of this recent trend, development of augmented reality end-user applications has become prevalent. Tools such as Snapchat's Lens Studio make it possible for independent developers to contribute as well. As of June 2020 over 1 million AR-based lenses had been created by developers. These tools make it easier to add augmentations on static predetermined objects (such as a face or a specific image).

The low-level concepts and technologies that surround AR applications that understand and enhance real-world data make reasoning about them (e.g., with respect to contextualization and decision-making capabilities) difficult. Moreover, the development of an AR application is a complex and time-consuming process.

It is with respect to these and other considerations that the various aspects and embodiments of the present disclosure are presented.

SUMMARY

A framework is provided for developing applications for ad-hoc enrichment of real-world data in augmented reality (AR) settings. Systems and methods are provided that allow developers to quickly and easily develop AR applications that enrich the real-world with data from the cloud. Given that the development of an AR application is a complex and time-consuming process, the systems and methods described herein allow software developers to concisely describe their needs in a succinct program, written in the QWL domain-specific language. The systems and methods take this program and automatically generate an AR application. An application accepts requests from client applications that capture input that can be joined with the cloud, and performs and returns the joins back to the client.

In an implementation, a system for generating data-enriching augmented reality (AR) applications from a domain-specific language is provided. The system comprises a data store and an AR application generating module configured to generate an AR application using a domain-specific language (DSL) and a fuzzy join operation.

In an implementation, a method for generating data-enriching augmented reality (AR) applications from a domain-specific language is provided. The method comprises receiving a program written in a domain-specific language (DSL); and generating an AR application based on the received program using the DSL and a fuzzy join operation.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 7 is an overview of high-level data types used for an example of an intermediate representation of QWL;

DETAILED DESCRIPTION

Figure 1:
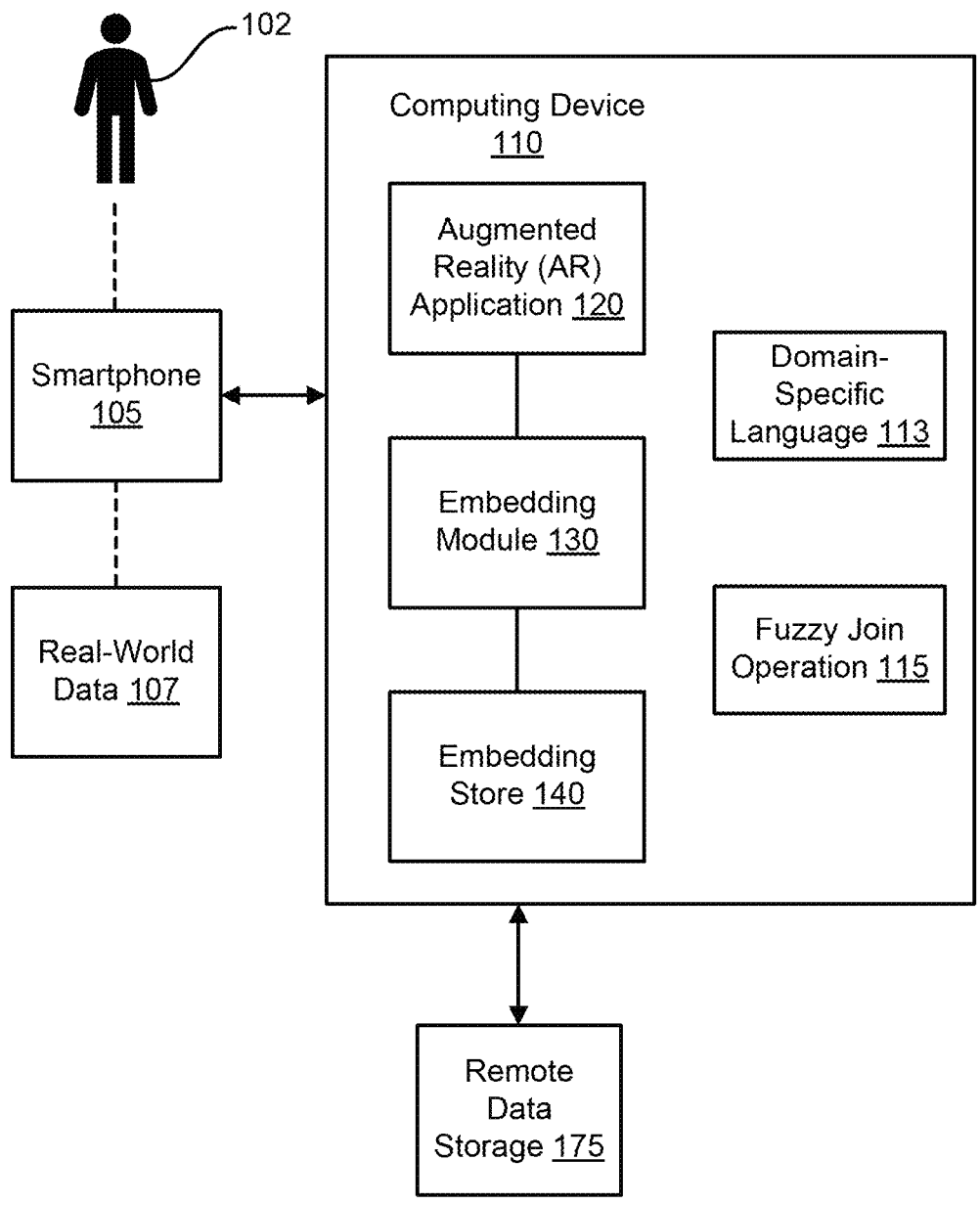
FIG. 1 is an illustration of an exemplary environment for generating data-enriching augmented reality (AR) applications from a domain-specific language.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Systems, methods, and platforms are provided for developing applications that enhance data captured in the real-world in an augmented reality (AR) setting. Built around a user-friendly domain-specific language, the systems, methods, and platforms allow developers to produce applications that allow a user to enhance real-world data by joining it with a remote data source. The systems, methods, and platforms allow the enrichment of ad-hoc data by introducing a semantic fuzzy join operation between real-world and remote data stores. Given a real-world data enrichment task, a developer defines the desired application in a domain-specific language that is built on an intuitive grammar for joining real-world data. The systems, methods, and platforms expedite the process of developing applications that enrich the real-world. Furthermore, applications built using the systems, methods, and platforms described herein require less programming effort. An application accepts requests from client applications that capture input that can be joined with the cloud, and performs and returns the joins back to the client.

The systems, methods, and platforms described herein drastically reduce the effort required to develop augmented reality software, and by simplifying software development, reduces the barrier-to-entry to augmented reality. This impacts the software industry, and all industries that can benefit from augmented reality.

The rise of AR as well as the data-rich paradigm presents a unique opportunity to inform a view of reality with the enormity of available remotely stored data. Hence, a framework for developing AR applications that utilize remote resources to enhance users' view of the real-world is warranted. However, there are some inherent challenges associated with this.

As a first example, consider a user visits a cafe and receives a printed menu. The user wants to order an appetizer but wants to know about its calorific and allergenic information first. Unfortunately, they does not recognize most items on the menu or the ingredients used in them. Consequently, they have to pore through each item in the appetizer section and manually look up its calorific and allergenic information, one-by-one. With an AR application developed using the systems, methods, and platforms described herein, the user views the menu through their smartphone's live camera feed and indicates they want to know more about the menu. This initiates a join of the information retrieved from the menu with a food database. The joined supplementary information is now available to the user. Joins between the real-world data (the menu) and the remote data (the nutritional information) are performed as described herein. Using the systems, methods, and platforms described herein, a developer can create such an application without worrying about the details inherent in joining the camera captured menu and structured data in the food database. With a script written in the DSL provided herein, the developer produces a scalable application server that performs the complicated join.

FIG. 1 is an illustration of an exemplary environment 100 for generating data-enriching AR applications from a domain-specific language. A user 102 uses a smartphone 105 (or other computing device) to access real-world data 107. The smartphone 105 is in communication with a computing device 110 which is in communication with a remote storage device 175, through one or more networks. The network(s) may be a variety of network types including the public switched telephone network (PSTN), a cellular telephone network, and a packet switched network (e.g., the Internet).

The computing device 110 comprises a domain-specific language (DSL) 113, a fuzzy join operation 115, an AR application 120, an embedding module 130, and an embedding store 140. These components and their interactions are described further herein. Depending on the implementation, some or all components of the computing device 110 may be comprised within the smartphone 105.

Although only one smartphone 105, one computing device 110, and one remote data storage are shown in FIG. 1, there is no limit to the number of smartphones 105, computing devices 110, and remote data storages 175 that may be supported.

Figure 10:
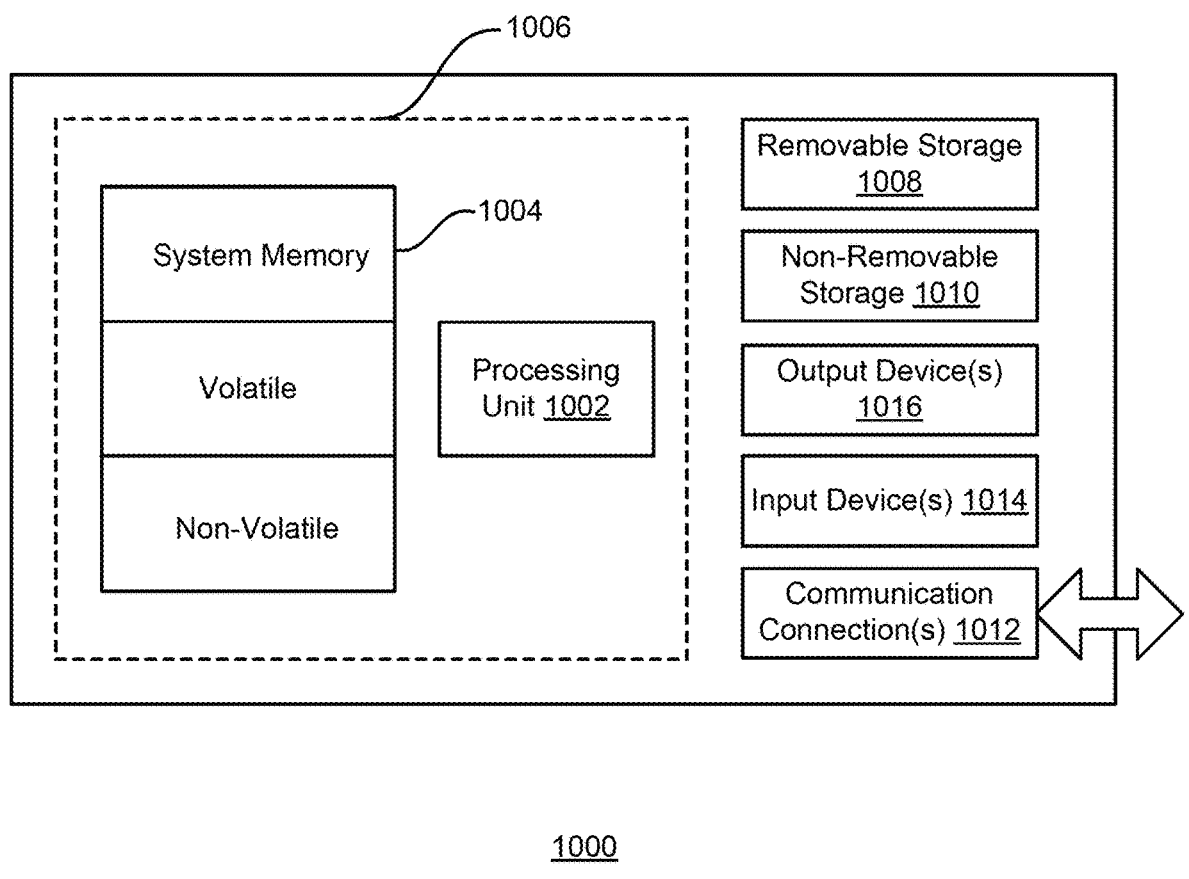
FIG. 10 shows an exemplary computing environment in which example embodiments and aspects may be implemented.

The smartphone 105, the computing device 110, and the remote data storage 175 may be implemented using a variety of computing devices such as servers, smartphones, desktop computers, laptop computers, tablets, set top boxes, vehicle navigation systems, and video game consoles. Other types of computing devices may be supported. A suitable computing device is illustrated in FIG. 10 as the computing device 1000.

Figure 2:
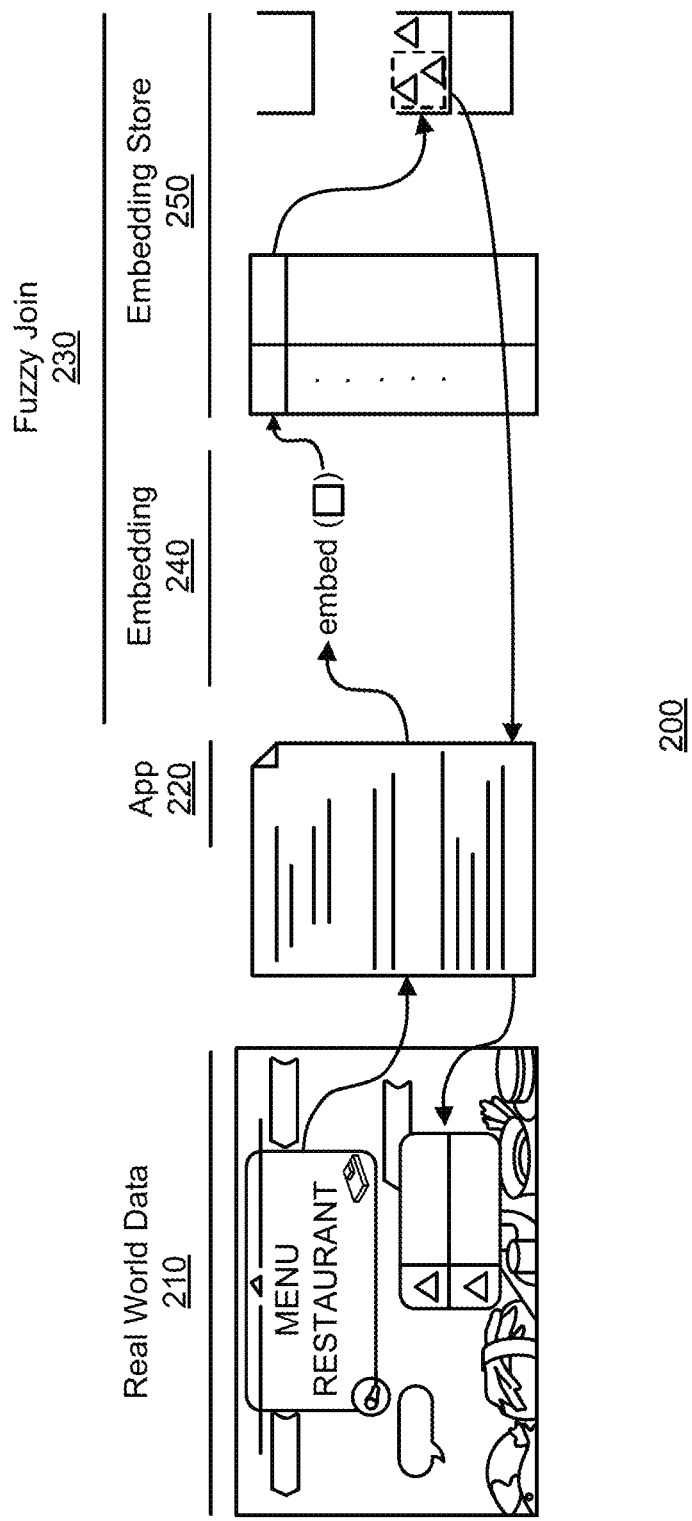
FIG. 2 is an illustration demonstrating an implementation of a flow of an application developed with the techniques herein performing a fuzzy join.
Figure 3:
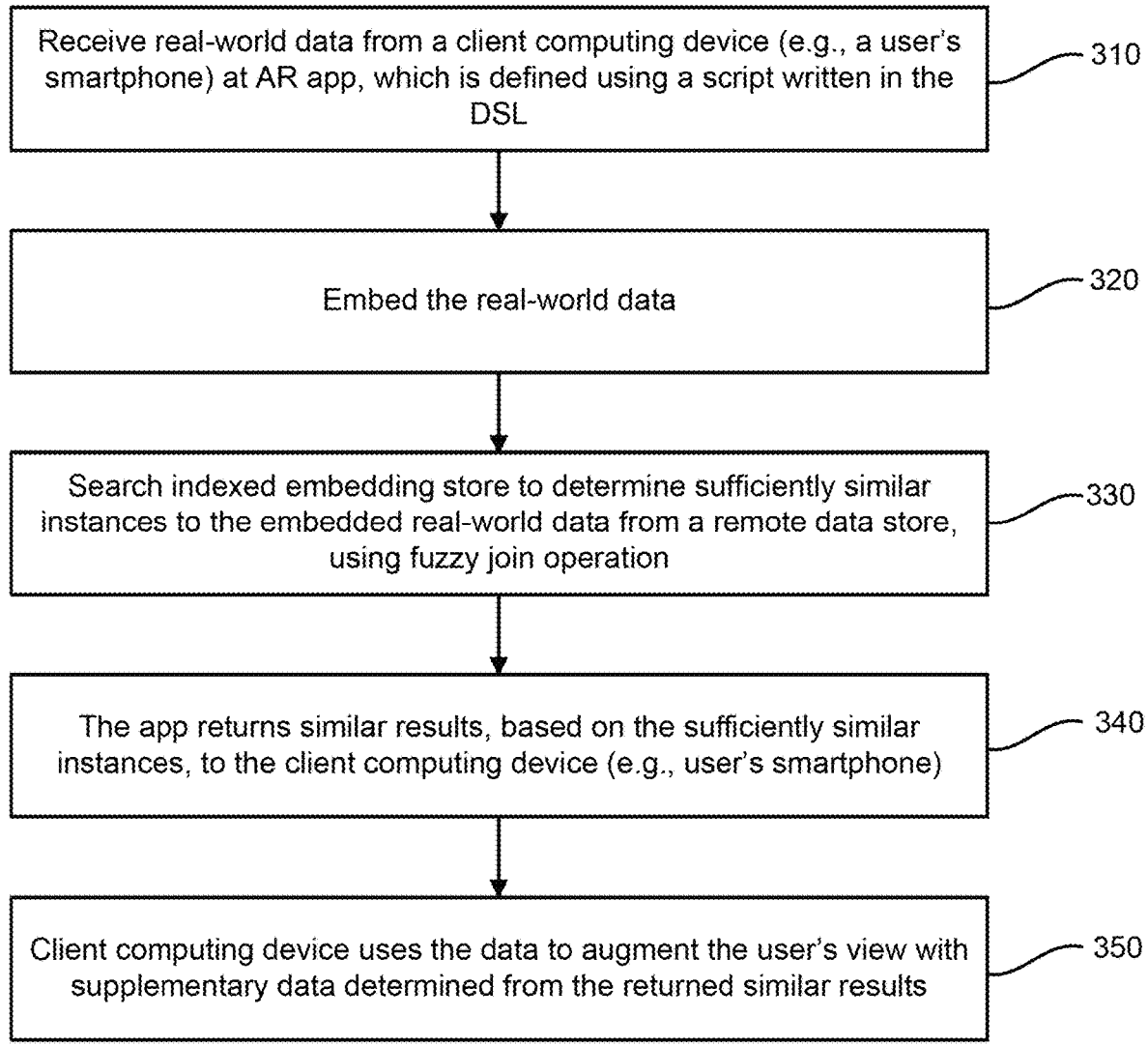
FIG. 3 is an operational flow of an implementation of a method for augmenting real-world data with supplementary data in an AR environment.

FIG. 2 is an illustration 200 demonstrating an implementation of a flow of an application developed with the techniques herein performing a fuzzy join. FIG. 3 is an operational flow of an implementation of a method 300 for augmenting real-world data with supplementary data in an AR environment, and is useful for describing FIG. 2. More particularly, FIG. 2 demonstrates the workflow of an app using the techniques described herein in which real-world data from a client is joined with a remote data store. The inherent challenges involved in developing applications that enhance and join real-world data in an AR setting are described further herein.

The client (e.g., the smartphone 105) sends data from the real-world (real-world data 210) to the app 220 (e.g., which may correspond to the app 120), which is defined using a script written in the DSL (e.g., the DSL 113), wherein it is received as shown at step 310.

At 320, the real-world data is embedded. A fuzzy join 230 operation (e.g., the fuzzy join operation 115) is performed. This comprises embedding 240 the data (e.g., using the embedding module 130).

At 330, once the data is embedded, the fuzzy join operation 230 finds sufficiently similar instances from a remote store (e.g., the remote data storage 175) by searching an indexed embedding store 250 (e.g., which may correspond to the embedding store 140). Two instances of data are sufficiently similar if they are within a predefined distance with respect to a user provided similarity measure, such as Euclidean distance or cosine similarity, for example.

At 340, the app returns similar results to the client (e.g., the smartphone 105), which at 350 can use the data to augment the user's view with supplementary data.

Real-world data is multimodal. Retrieving desired information, therefore, may require accounting for multiple modalities of the data. Consider the scenario in the first example described above. Previous work on obtaining information from visually rich documents indicates that extracting information such as the 'price' of a food requires considering the visual features of the menu layout. Therefore, a development framework that enables joining with real-world data will need to be able to account for multiple modalities of input such as text, image, and more.

To supplement real-world data with additional information, remote data stores are used. These remote stores can be structured, such as a relational data store, or unstructured, such as a collection of text. Real-world data can be joined against these data stores to augment them with additional information. However, provided by different organizations, these data stores can be diverse. Joining against data stores with heterogeneous schema is a challenging task, which leads to expensive overhead for the relational operator. A solution to this problem is to use an approximate JOIN operator based on the semantic similarity between the real-world data and an instance of data in a remote store. The input data is represented using a fixed-length embedding vector for this purpose. Remotely stored data is embedded as well. The embedding vectors of fixed-length allow for the comparison of data from multiple modalities in the same vector space.

In addition to the presentation of data, the set of possible tasks on a given instance of real-world data is heterogeneous. It is desirable to consider that certain tasks that join real-world data are only possible with access to remote data that is not public. General purpose vision-based querying systems use technologies such as optical character recognition (OCR), image search, and location to provide generalized insights into real-world data by using publicly available data. These systems limit the use cases of the system to the assumed tasks. It is conceivable that one of these systems could assume the task from the example above that retrieves nutritional information for dishes from the menu. Instead, consider a scenario where the restaurant manager wants to enhance the menu with inventory information so employees know when items are out of stock. The database containing inventory data is private, hence a general purpose system which does not have access and assumes a general task is incapable of being used for this task. Thus, a flexible framework to allow its end-users to specify task workflows that join real-world data with remote data is warranted.

A framework is provided for developing applications for ad-hoc enrichment of real-world data in AR settings. A semantic fuzzy join operation is used for enriching real-world data with remote data stores across multiple modalities in an AR setting. A domain-specific language (referred to herein as QWL) allows a user to express tasks specific to their needs in an intuitive manner. A performant framework is provided for developing applications that perform the semantic fuzzy join operation specified using the DSL (i.e., QWL).

By deriving the semantic fuzzy join operation, a tool is provided for enriching the real-world with remote data. By providing a DSL (i.e., QWL) that is backed by an easy to understand grammar for real-world data enrichment, the process of developing applications that use the fuzzy join is democratized. This is packaged into a performant framework used to create AR applications that join on the real-world. The platform interprets the DSL to produce a scalable application server that can join real-world data with remote data. Results suggest (a) using the platform leads to more succinct application codebases while maintaining expressibility and performance, and (b) the QWL is intuitive and usable.

Assume: (1) a portion of a live camera-view acts as the focused view V in an AR setting for a given data enrichment task, and (2) data x appearing in the focused view V is JOIN-ed against data instance $t_i$, $\forall i$ of a structured or unstructured data store D, if x and $t_i$ can be projected to a metric space f, where x is closer to $t_i$ based on a distance metric $d(.)$ than data $t_j$, $\forall j \neq i$ in D. Given a program written in the QWL DSL, the framework produces an application server that accomplishes the defined task(s) by performing joins between input from the real-world and remote data stores.

With respect to comparing data from multiple modalities, to handle diversity in data modality, the data from the real-world and the remote data are transformed into a common metric space. The data being enhanced is joined against the K most semantically similar remote data instances in the metric space. The platform uses the notion of embedding vectors for this purpose. The platform expresses both the input from the real-world and remote data as vectors of fixed dimension such that similar instances are close to each other in a common metric space. Joining based on the distance between two vectors in this metric space, instead of exact value matches, ensures that the heterogeneity in schema provided by different organizations as well as diverse real-world data is effectively handled in the platform's workflow. The join operation is described further herein.

With respect to semantic fuzzy join, to contextualize real-world data with additional information, they are joined with remote data instances based on their degree of similarity in a common metric space. In order to perform the join, retrieve matches between the input and remote data such that distance between the embedding vector representing the input data and the remote data in the learned metric space is minimized. In some implementations, cosine similarity between two embedding vectors is used. This is referred to as a semantic fuzzy join operation. An approximate nearest neighbor (ANN) search is executed over the space of embedding vectors to find the candidate remote data instances for the join operation. The implementation details of generating, storing, and indexing embedding vectors representing both remotely stored data and real-world data are described further herein.

Regarding defining AR applications with fuzzy joins, while designing the DSL (QWL), it was desired to preserve the expressiveness of generalized frameworks while casing the burden of developing the fuzzy joins required by AR applications that join real-world data. To accomplish this, an approach is derived that allows the developer to define their application in a stateful manner while defining complex fuzzy join operations in a declarative manner.

Figure 9:
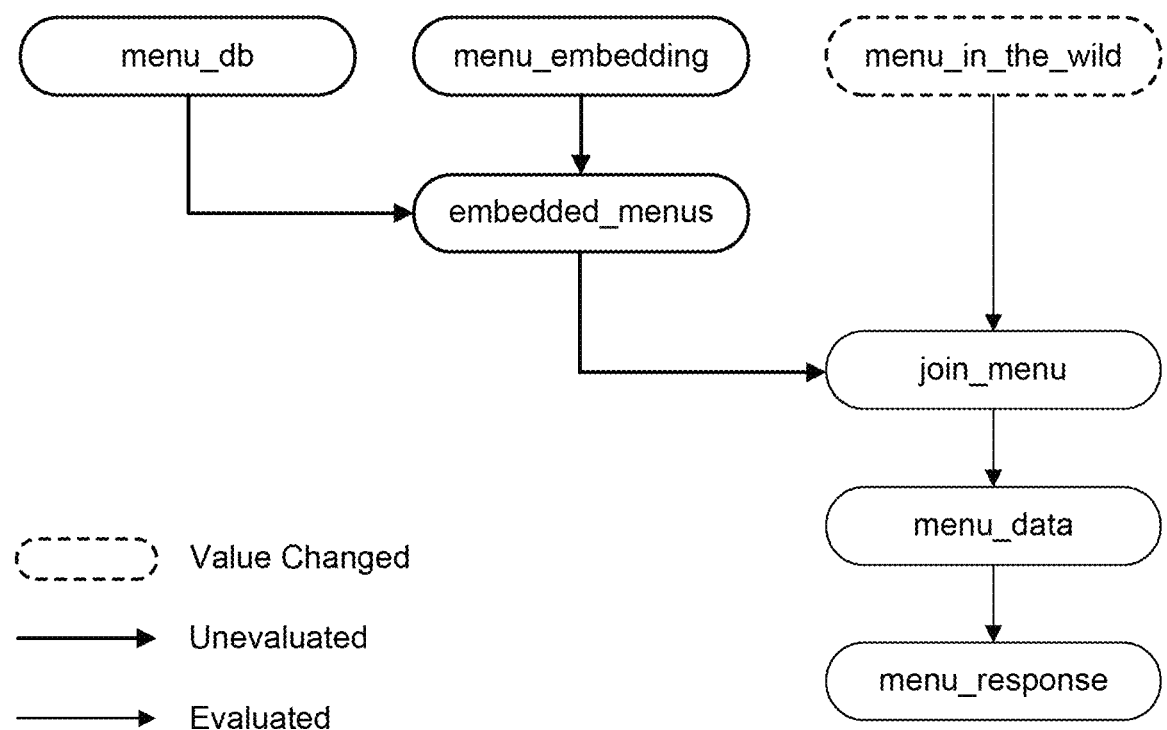
FIG. 9 presents an example dependency sub-graph relevant to the QWL code presented in FIG. 8.

Scripts written in QWL define a directed acyclic graph (DAG) of nodes that represent event-driven data flow elements. The edges in the DAG define the dependency relation amongst the nodes. To elaborate, each node in the graph defines its own "query plan." The query plan for a node is executed when either input from a client triggers the execution of the node's plan, or a node that the query plan depends on has been evaluated (or reevaluated). FIG. 9, described further herein, provides an example of a graph produced by QWL. The results of the join nodes are materialized for later use. The materialization of join results meant for client consumption is reasonable because there is a limit by the AR context in which a user can only comprehend a small number of results.

This approach allows a developer to define their application in an intuitive stateful script without worrying about the details of complex data flow operations surrounding fuzzy joins. The result is a performant application that enriches real-world data.

Figure 4:
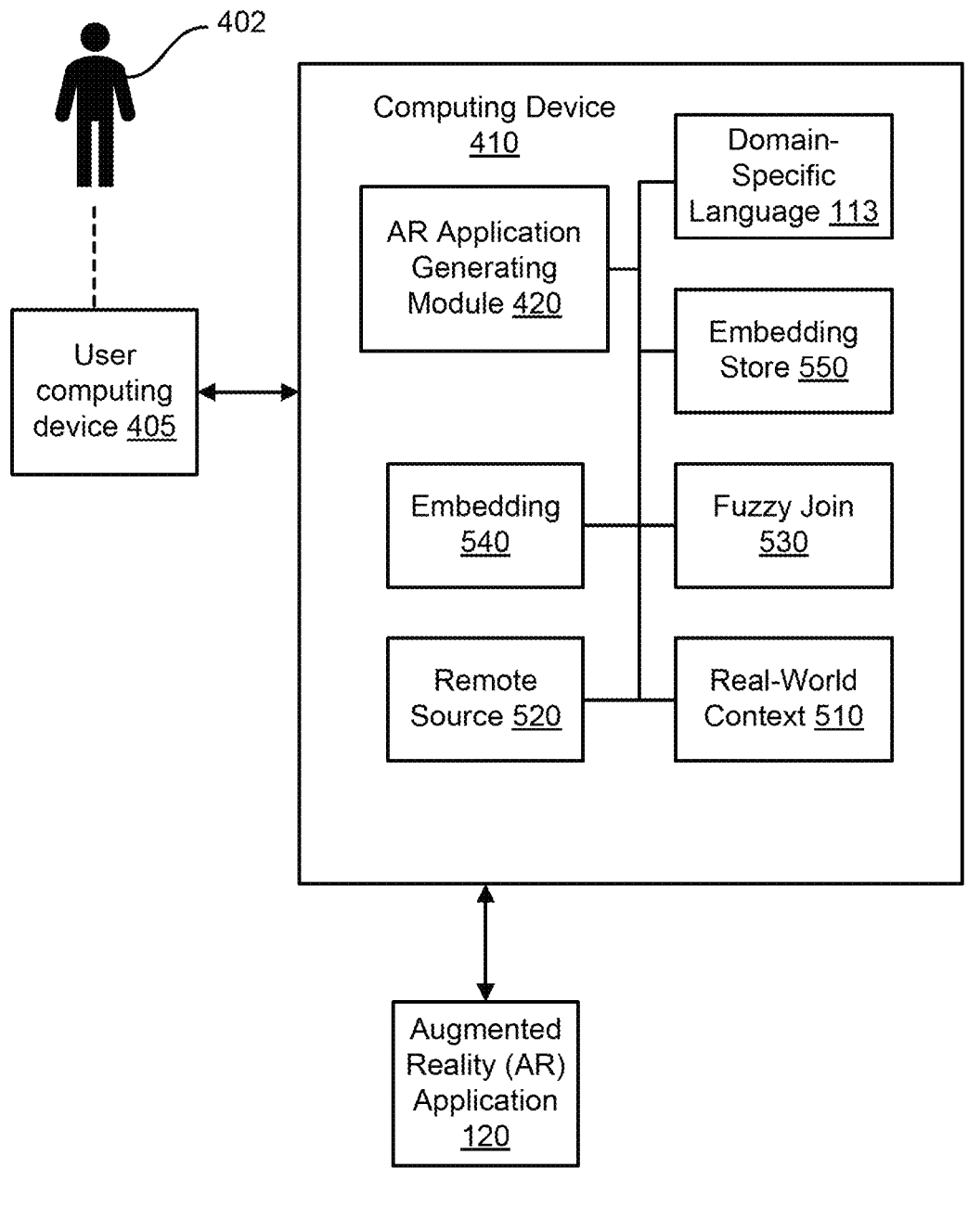
FIG. 4 is an illustration of another exemplary environment for generating data-enriching AR applications from a domain-specific language.

FIG. 4 is an illustration of another exemplary environment 400 for generating data-enriching AR applications from a domain-specific language, and is useful for describing FIG. 4. A user 402, such as a developer, can use their computing device (e.g., user computing device 405, an example of which is described with respect to FIG. 10) to access an application generating module 420 on another computing device 410 to generate an AR app 120 using a DSL 113 and the grammar described herein e.g., with respect to FIG. 5. Depending on the implementation, some or all components of the computing device 410 may be comprised within the user computing device 405.

Figure 5:
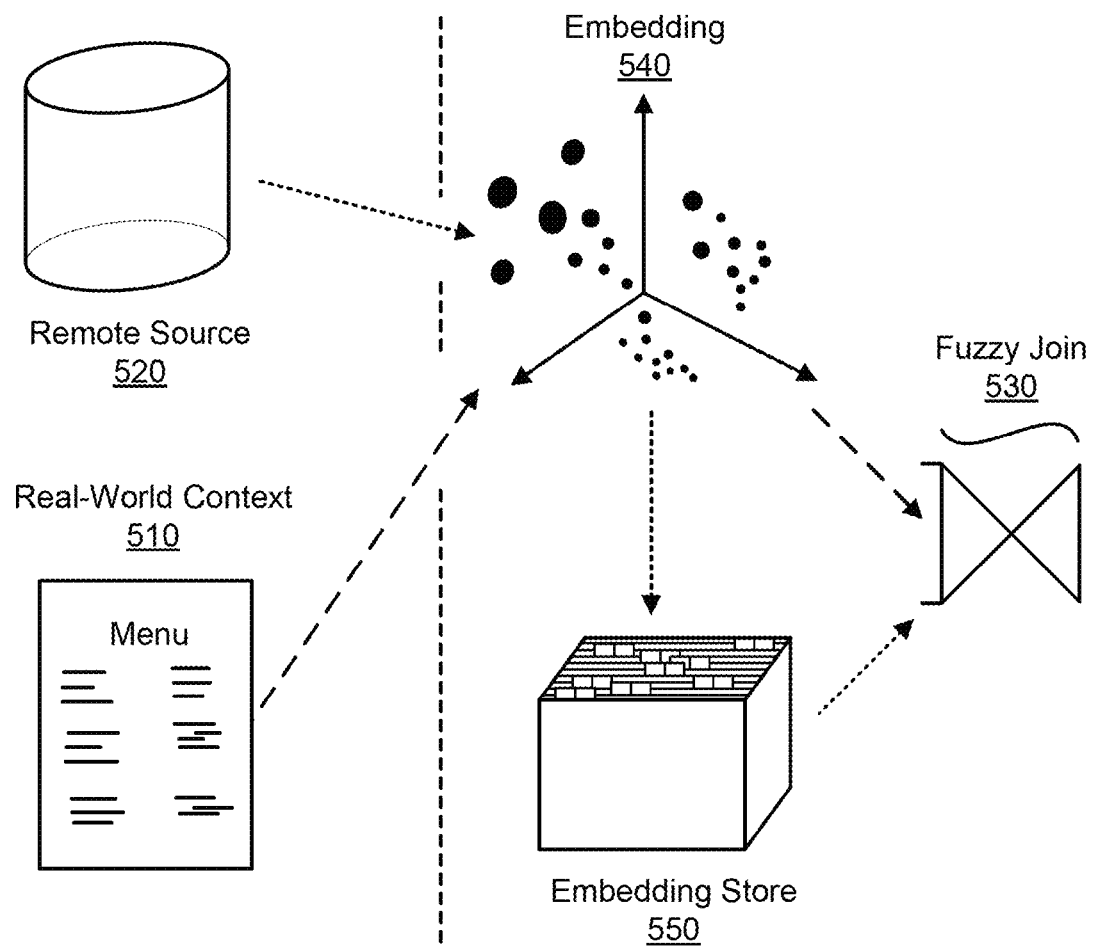
FIG. 5 shows a high-level view of an implementation of a grammar for joining on the real-world.

FIG. 5 shows a high-level view of an implementation of a grammar 500 for joining on the real-world. The dotted line arrows indicate the path data takes from remote sources to a fuzzy join, and the dashed line arrows indicate the path for data from real-world context.

Grammar for joining on the real-world is described. The grammar defines applications of varying tasks that perform joins on real-world data. The grammar captures core components of applications that join real-world data with remote data while maintaining expressibility. Using the grammar as a basis, the framework implements a DSL (i.e., QWL) for application specification, as described further herein. The grammar is described in two facets: data sources and transformations.

Regarding data sources, data are collections of data instances of varying modalities that originate from one of the data sources defined by the grammar. In this context, a data source is any external data that is a part of an application. Three data sources are defined: remote sources 520, embedding stores 550, and real-world context 510.

Regarding remote sources 520, a remote source 520 is a source of data that is meant to be joined with data from the real-world (real-world context 510). For example, the example above, the food database is a remote source. Formally, a remote source 520 comprises a pair of functions. One function retrieves a collection of data instances with identifiers from the remote store, allowing the data to be embedded and identified. The other function retrieves a subset of that collection from the remote store that corresponds to a given set of identifiers, allowing embedded instances retrieved while joining to be associated with remote data in their original representation. A remote source 520 is parameterized to account for scenarios in which the way data is retrieved depends on other values in the environment. For example, the data retrieved by a remote source 520 may change with a user's location provided in some real-world context 510. The data from a remote source 520 is often data that is embedded and used in a fuzzy join, meaning it often ends up in an embedding store 550.

Regarding embedding stores 550, data that has been embedded for joining against are stored in a remote data store, which is called an embedding store. Remote data sources that are embedded for joining can be very large, thus the stores are essential for those embeddings 540 so they can be accessed efficiently without the need for re-computation. An embedding store 550 comprises the storage and indexing of embedded data that will be used as the right operand in a fuzzy join 530. An embedding store 550 is used for efficient fuzzy joins on large data sets because it indexes the vector embedded data for efficient ANN search. Embedding stores take indexing schemes and their parameters as input, with details provided further herein. It is not necessary to specify how the embedded data is stored. It can be stored alongside its original implementation or totally separate. The only requirement is that the stored data can be indexed for ANN searching and that it has a reference to the primary key needed to retrieve the original data. Embedding stores 550 are read from when a fuzzy join 530 between some real-world context 510 and the embedded data occurs.

Regarding real-world context 510, think of real-world context as a data instance provided by a user from their surroundings. For example, real-world context could be an image of a receipt, a transcript of some speech, or the restaurant menu from the example above. The type of real-world context 510 is defined beforehand with attributes that correspond to real-world types: image, text, speech, etc. Each definition of real-world context 510 serves as an outlet that receives captured data that then triggers other operations within an application.

Regarding transformations, throughout an application session, real-world context 510 is captured and then transformed by an application server into a result that enriches data from the real-world. The most pivotal of these transformations is the fuzzy join 530 operation, which utilizes embedding 540 functions for semantic comparison. Generalized inline transforms are used to format join results and other intermediate data. These three transformations are described herein.

Regarding embedding functions, utilize embedding vectors to compare real-world data with remote data. In order to get the embedded vectors, embedding functions are employed that take data and embed them in the relevant vector space. A set of embedding functions contains a function for each modality of data embedded in the shared space defined by the embedding. Like remote sources, embedding functions are parameterized so that they can be predicated on other values from the application environment. The embedding functions are used on remote data from remote sources and data from real-world context to prepare it for the fuzzy join operation.

The fuzzy join operation performs what is essentially a left-outer join between real-world context and remote data from remote sources, which have both been transformed by embedding functions. The result is the data from the left operand (real-world data) joined with semantically similar data from the right operand (remote data). The results of the join operation contain information that is supplementary to the provided data from real-world context. These results are formatted using inline transforms before being returned.

Regarding inline transforms, the data returned from a fuzzy join is a collection of joined data instances. Inline transforms are functions that take the data frame representation of the result of the evaluation of a grammar element and transform it into a new representation. Inline transforms can, therefore, take joined results and format them for use by a client. For example, a built-in inline transform function takes joined data and represents it in a JSON (JavaScript Object Notation) format that would be suitable for representing the result as a table, which could be utilized by an AR client that would like to augment supplementary information as tables on real-world data.

Regarding applying transformations, the programming model of QWL is such that an application is written as if it is a stateful script. Data sources and transformations are written as if all the required data is available, even though vital real-world context is not provided to start. To account for this, a function application construct called waited application is used. Waited application lazily evaluates an expression based on when the expressions it depends on are available (not waiting). By default, real-world context is waiting, and thus all its dependents are waiting as well. In QWL, use the given function to achieve waited application.

Figure 6:
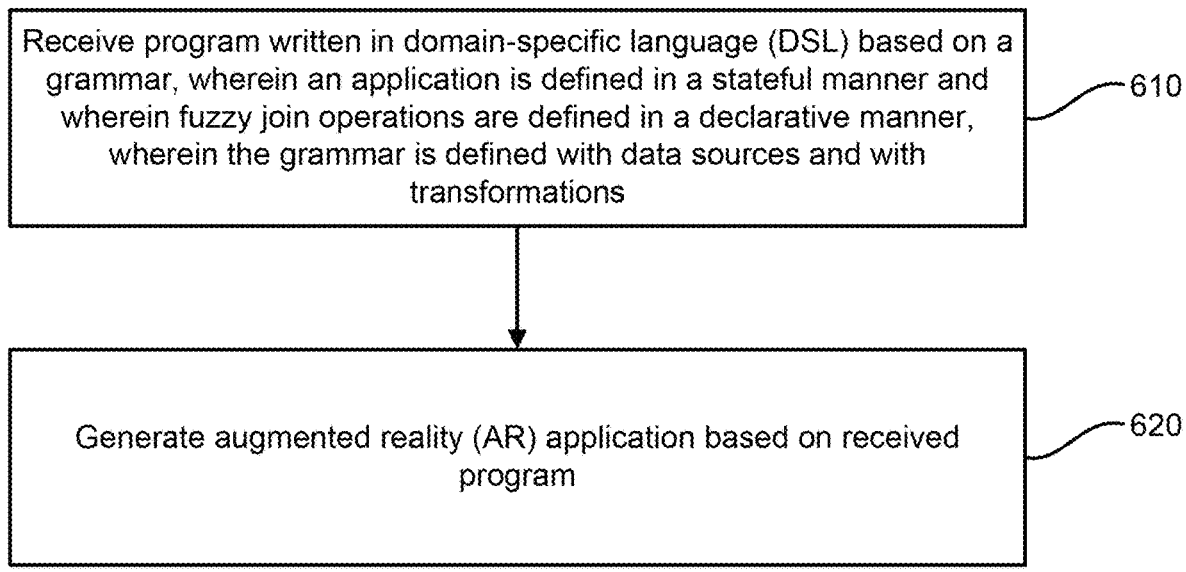
FIG. 6 is an operational flow of an implementation of a method of generating data-enriching AR applications from a domain-specific language.

FIG. 6 is an operational flow of an implementation of a method 600 of generating data-enriching AR applications from a domain-specific language. The method may be implemented using some or all of the systems and techniques described herein, such as those of FIGS. 4 and 5, for example, in some implementations.

At 610, program written in a DSL (such as QWL) based on a grammar (such as that described further herein) is received at an application generating module, such as the application generating module 420. As described further herein, the application is defined in a stateful manner and fuzzy joins are defined in a declarative manner. The grammar is defined with data sources and transformations as described further herein.

At 620, an AR app is generated by the application generating module based on the received program. The AR app may then be used as described further herein.

FIG. 7 is an overview 700 of high-level data types used for an example of an intermediate representation of the domain-specific language QWL. The types are represented using a Haskell syntax for brevity. These are utilized in a client application that uses the framework, as described further herein.

Implementation details of various components of the framework are now described.

Figure 8:
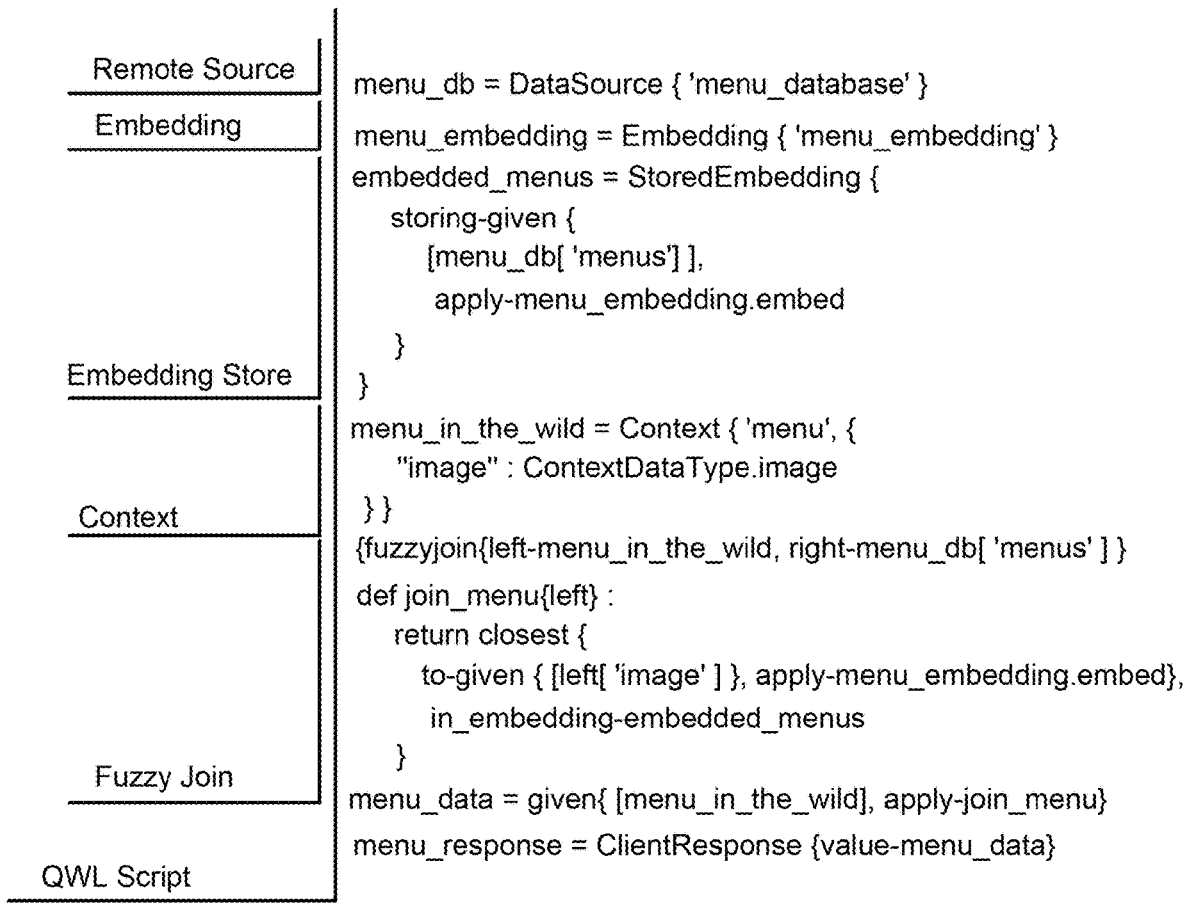
FIG. 8 provides an example of the Python QWL dialect.

The specification of an AR application developed using the platform is represented in an intuitive DSL, QWL. A JSON intermediate representation defines QWL. The intermediate representation follows a grammar (based on the grammar described further herein) which makes it straightforward to provide different "dialects" of QWL by developing an interface that produces this intermediate representation. Python and Swift interfaces have been developed to produce specifications in the QWL format. FIG. 8 provides an example of the Python QWL dialect. QWL specifications represent applications as a partially ordered collection of top-level declarations, called the environment. Internally, each declaration contains an identifier, an expression, the value of the expression's last evaluation (if it is not waiting), and the list of references to declarations that wait on it. FIG. 7 presents an overview of the intermediate representation.

The execution engine begins by performing a static analysis of the DSL, forming the dependency graph between declarations by filling in the waitedBy attributes of declarations in the environment, and creating an endpoint for each declaration of a context expression. Each context expression represents an input modality (e.g., transcription, image, geolocation, etc.). This type corresponds to real-world context from the grammar.

FIG. 8 provides an example 800 of the Python QWL dialect.

Upon startup, the environment is evaluated and stored externally by the application server. In an implementation, use Redis to store the environment. A client of the application acquires input data (context in FIG. 8) and posts it to the server. The platform loads the environment of the application session and evaluates the declarations within the environment. Evaluation of the declarations in the environment is recursive, following the dependency graph derived from the DSL's static analysis. A topological sort of the expressions within the dependency graph that require evaluation determines the order of evaluation. A value is returned to the client when a ClientResponse expression evaluates to a value that is not waiting.

In FIG. 8, if a user posts a menu image to the/menu endpoint created by the menu_in_the_wild declaration of context, then join_menu, menu_data, and menu_response will be evaluated in their presented order. Because menu_response is a declaration of a ClientResponse expression and it will evaluate to a value that is not waiting, the menu_data variable will be returned to the client.

Regarding the application server, the primary function of the application server produced by QWL is to manage the execution of each session's environment. Each environment is reevaluated when the input data (context) is sent to the application server in a POST request, where the POST endpoint is determined by the name of the context declaration as provided in the intermediate QWL representation.

The platform serializes (e.g., use the JSON intermediate representation) and stores each environment in external storage, indexed by its session ID. In an implementation, use Redis to store environments.

Data tied to the session state is stored in the state of the session's environment. Intermediate join results are assumed to be of reasonable size and thus are materialized and stored in the session state as well. If a developer wishes to store join results externally, the platform allows them to supply custom storage and retrieval functions. The platform fetches remote sources (DataSources in QWL) lazily using their associated functions. The storage of embedded vectors is described further herein.

FIG. 9 presents an example dependency sub-graph 900 relevant to the QWL code presented in FIG. 8. The graph 900 shows the evaluation that occurs when data from the menu is posted to the client. The platform evaluates declarations that depend on data from the menu once the input data is posted.

Semantic fuzzy join and stored embeddings are described. Consider constraints imposed by the AR context when developing the join operation. The multimodality of real-world data warrants the use of shared-space embeddings for semantic comparisons. Also, consider the expected size of the result set. Contemporary researchers have shown that users have trouble tracking more than four or five objects at a time. Therefore, the result set of the join operation in an AR session needs to be of small size. The join should also be fast enough to be bound within acceptable latency. With these constraints in mind, develop the semantic fuzzy join operation within the framework.

The left operand of the join operation is a set of real-world data instances, and the right operand is data instances from remote data stores. Each instance of data is embedded as a fixed-length vector in a shared metric space. In the case that an embedding store does not depend on anything that is unavailable at startup, store the embedded vectors for that store and share the store across sessions. This ensures that large remote data-sets are embedded and stored before a join is executed. Join predicates are defined as the approximate nearest neighbors (ANN) of the left operands from the set of right operands (remote data instances). The result set of the join operation is {k-ANN (l, embed(R)): l∈embed(L)}. Where L and R are the left and right operands, respectively, and k is specified in QWL specification using the Nearest-Neighbors type. This operation retrieves k instances of data from the right operand that are semantically similar to instances from the left operand. The use of a nearest neighbors operation implies that no left operand instances (real-world data) goes unmatched in the join. Therefore, it can be thought of as a left outer join on the real-world.

In order to efficiently perform the approximate nearest neighbor operation, use an inverted file system with asymmetric distance computation (IVFADC) framework for indexing embedded vectors. This indexing method uses a coarse quantizer, which assigns vectors to their corresponding element in the inverted file system. This coarse quantizer can be trained if needed. Each element in the inverted file system contains a set of similar vectors quantized using a fine quantizer. When querying, the query vector is assigned an element in the inverted file system, and compared to the quantized vectors within the same inverted file system element. The query vector is not quantized, hence the asymmetric distance calculation. In an implementation, use Redis as an external key-value store for the elements of the inverted file system.

In an implementation, there are three indexing options. Provide a locality-sensitive hashing (LSH) based method which uses the binary sequences produced from locality sensitive hashes as the coarse quantizer, with no fine quantization. Provide a method which uses k-means centroids as the coarse quantizer, and product quantization for fine quantization. Call this method IVFPQ.

Additionally, provide the method just described with no fine quantization. Call this method IVF. Custom indexing methods within the IVFADC framework are integrated by providing a coarse and fine quantizer.

An example is described. Restaurant Retrieval: Walk through. The restaurant retrieval task takes a view of food in the real-world as input and retrieves nearby restaurants that serve similar food. The application returns Yelp entries for relevant nearby restaurants the user might want to visit. The process of producing such an application from the perspective of a developer is described.

It is convenient to first identify the requirements in terms of a grammar described above such as real-world context, remote data sources to enhance the real-world context with, and a shared space embedding used to compare them. The real-world context as an example is to enhance is food. The remote data source is the Yelp entries of nearby restaurants. To join these two, first join the food captured from the real-world with the recipe dataset and then join with the Yelp dataset. The recipe dataset contains recipes with instructions and ingredients that they contain and images that correspond to the recipes. The Yelp dataset contains textual reviews of restaurant food. Utilize an embedding to align images of food with recipes to join with the recipe dataset, and an embedding to align recipes with Yelp entries to join with the Yelp dataset. When composed, these joins form a join of images of food in the real-world with Yelp entries.

Regarding embeddings, start by obtaining the embedding functions required for the task. The embedding required to perform a task is a mandatory precondition, and thus start development with the embedding functions. Learn the embedding function used for aligning food and recipes using a triplet network. Embeddings can be used to train the embedding function that aligns recipes and Yelp entries. This is achieved by treating each recipe as a document and each review for a restaurant as a document. The embedding for a restaurant is obtained by aggregating all review vectors for the restaurant.

Implementing the functions that gather data for a sample application is straightforward because all the datasets are public in remote data sources. Write a function for each source of remote data (recipe and Yelp data) that retrieves the data. Data from these sources is embedded using embedding functions and stored in an embedding store. To determine the embedding store that is utilized, consider the size of the data to be embedded and stored. Here assume that the embedded recipe and Yelp vectors can fit in the external Redis store without using a fine quantizer. With this in mind, use the IVF indexing method in an embedding store. Specify this in the project's configuration file (project.yaml). The last data source to consider is the real-world context, which is to take to be an image of food from the real-world. The real-world data context is specified in a Context expression in the QWL script.

With the prerequisites in order, write the QWL specification. Start by defining the DataSource and Embedding. Use the embedding to embed the data source and store the embedded data using a StoredEmbedding expression. Define real-world context in a Context expression that accepts an image. The context expression is the left operand of the fuzzy join and the embedded remote data is used as the right operand. Define the FuzzyJoin using a function that returns a join predicate that uses the closest function. Apply the fuzzy join using the given function and get the result of the join. The result is optionally formatted and then sent back to the user in a ClientResponse expression. The script follows a format similar to that in FIG. 8 that shows QWL code for the café example described above.

With the QWL application configured and specified, the application server is ready to be started. Run an init from a project directory, which embeds and stores data that is global to all sessions. Additionally, the base environment is stored for the given project. To start the application server, run from the project directory. This results in a working application server that accepts requests according to the Context definitions.

Additional examples are described.

A restaurant recommendation is described. This is an application in which a user submits a restaurant to the framework which joins the restaurant with similar restaurants from Yelp. Restaurants are embedded using a word embedding model on the Yelp reviews that correspond to the restaurants. The Context expression accepts the name of a restaurant from a user and uses the Yelp dataset or API to get the restaurant reviews. The given restaurant is joined with embedded restaurants from the Yelp API or dataset.

A coin valuation is described. An application that tells a user the value of a rare penny they captured through a camera feed. The application would do this by joining the image of the penny with a database from cointrackers.com. OCR is combined with image features to embed pennies' images. The application's remote data source is a database of images and text for each penny obtained from the coin trackers website. The Context expression accepts an image of a captured penny, and text obtained from OCR performed by the client. The FuzzyJoin finds the most likely penny matches from the pennies database and returns the value of those probable penny matches.

Finding bike parts is described. The application utilizes a database of bikes and their parts. Given a bike captured through a camera feed, this application returns a list of links to that bike's parts. A shared space embeds the database and bike images, which utilizes the bike descriptions in the database. The Context expression accepts a bike image, and the fuzzy join finds likely bikes from the database and then returns the parts that correspond to that bike.

Thus, a grammar is provided for AR apps that enhance real-world data with outside information. A platform is provided to build applications for enhancement of real-world data in an AR setting. Marker-less AR is provided in which experiences are determined based on semantic relationships. The systems and methods here are capable of handling multimodal real-world data as well as heterogeneous relational database schema within the interactive latency imposed by AR interfaces.

FIG. 10 shows an exemplary computing environment 1000 in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by the device 1000 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

In an implementation, a system for generating data-enriching augmented reality (AR) applications from a domain-specific language is provided. The system includes a data store and an AR application generating module configured to generate an AR application using a domain-specific language (DSL) and a fuzzy join operation.

Implementations may include some or all of the following features. The application generating module is configured to receive a program written in the DSL, and generate the AR application based on the received program. The AR application is defined in a stateful manner and wherein the fuzzy join operation is defined in a declarative manner. The DSL is based on a grammar, wherein the grammar is defined with data sources and with transformations to join remotely retrieved data with real-world data. The AR application is configured to augment real-world data with supplementary data from a remote data source, in an AR environment. The real-world data is live data from a camera feed. The AR application is configured to receive real-world data, perform a fuzzy join operation on the real-world data comprising embedding the data, finding sufficiently similar instances to the real-world data from a remote data source, and outputting results to augment a user view of the real-world data with the results. An embedding vector representing input data from the real-world data and remote data from the remote data source is used to determine the sufficiently similar instances. The DSL is configured to provide scripts that define a directed acyclic graph (DAG) of nodes that represent event-driven data flow elements. The data store comprises at least one of a remote source, an embedding store, or a real-world context. The fuzzy join operation is configured to perform a left-outer join between real-world context and remote data from remote sources, which have both been transformed by embedding functions.

In an implementation, a method for generating data-enriching augmented reality (AR) applications from a domain-specific language is provided. The method includes receiving a program written in a domain-specific language (DSL); and generating an AR application based on the received program using the DSL and a fuzzy join operation.

Implementations may include some or all of the following features. The method further comprises defining the AR application defined in a stateful manner and wherein the fuzzy join operation is defined in a declarative manner. The DSL is based on a grammar, wherein the grammar is defined with data sources and with transformations to join remotely retrieved data with real-world data. The AR application is configured to augment real-world data with supplementary data from a remote data source, in an AR environment. The real-world data is live data from a camera feed. The AR application is configured to receive real-world data, perform a fuzzy join operation on the real-world data comprising embedding the data, finding sufficiently similar instances to the real-world data from a remote data source, and outputting results to augment a user view of the real-world data with the results. An embedding vector representing input data from the real-world data and remote data from the remote data source is used to determine the sufficiently similar instances. The DSL is configured to provide scripts that define a directed acyclic graph (DAG) of nodes that represent event-driven data flow elements. The fuzzy join operation is configured to perform a left-outer join between real-world context and remote data from remote sources, which have both been transformed by embedding functions.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for generating data-enriching augmented reality (AR) applications from a domain-specific language, the system comprising:
   a data store; and
   an AR application generating module configured to generate an AR application using a domain-specific language (DSL) and a fuzzy join operation, wherein the AR application is configured to augment real-world data with supplementary data from the data source by:
   expressing the real-world data as a vector;
   determining at least one vector of a plurality of vectors that is similar to the vector of the real-world data using a search executed over the plurality of vectors, wherein each vector of the plurality of vectors expresses the supplementary data; and
   performing the fuzzy join operation of the vector of the real-world data and the determined at least one vector of the plurality of vectors to augment the real-world data with the supplementary data from the data source.

2. The system of claim 1, wherein the AR application generating module is configured to receive a program written in the DSL, and generate the AR application based on the received program.

3. The system of claim 1, wherein the AR application is defined in a stateful manner and wherein the fuzzy join operation is defined in a declarative manner.

4. The system of claim 1, wherein the DSL is based on a grammar, wherein the grammar is defined with data sources and with transformations to join remotely retrieved data with real-world data.

5. The system of claim 1, wherein the real-world data is live data from a camera feed.

6. The system of claim 1, wherein the DSL is configured to provide scripts that define a directed acyclic graph (DAG) of nodes that represent event-driven data flow elements.

7. The system of claim 1, wherein the data store comprises at least one of a remote source, an embedding store, or a real-world context.

8. The system of claim 1, wherein the fuzzy join operation is configured to perform a left-outer join between real-world context and supplementary data, which have both been transformed by embedding functions.

9. A method for generating data-enriching augmented reality (AR) applications from a domain-specific language, the method comprising:
   receiving a program written in a domain-specific language (DSL); and
   generating an AR application based on the received program using the DSL and a fuzzy join operation, wherein the AR application is configured to augment real-world data with supplementary data from a data source by:

expressing the real-world data as a vector;
determining at least one vector of a plurality of vectors that is similar to the vector of the real-world data using a search executed over the plurality of vectors, wherein each vector of the plurality of vectors expresses the supplementary data; and
performing the fuzzy join operation of the vector of the real-world data and the determined at least one vector of the plurality of vectors to augment the real-world data with the supplementary data from the data source.

10. The method of claim 9, further comprising defining the AR application defined in a stateful manner and wherein the fuzzy join operation is defined in a declarative manner.

11. The method of claim 9, wherein the DSL is based on a grammar, wherein the grammar is defined with data sources and with transformations to join the supplementary data with the real-world data.

12. The method of claim 9, wherein the real-world data is live data from a camera feed.

13. The method of claim 9, wherein the DSL is configured to provide scripts that define a directed acyclic graph (DAG) of nodes that represent event-driven data flow elements.

14. The method of claim 9, wherein the fuzzy join operation is configured to perform a left-outer join between real-world context and remote data from remote sources, which have both been transformed by embedding functions.

* * * * *